United States Patent
Houlihan et al.

(10) Patent No.: US 9,732,257 B2
(45) Date of Patent: Aug. 15, 2017

(54) CURABLE ACRYLATE OR METHACRYLATE COMPOSITIONS

(71) Applicant: Henkel IP & Holding GmbH, Duesseldorf (DE)

(72) Inventors: James Houlihan, County Dublin (IE); Brendan Kneafsey, County Dublin (IE); Nigel Sweeney, Dublin (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 14/852,751

(22) Filed: Sep. 14, 2015

(65) Prior Publication Data

US 2016/0002507 A1   Jan. 7, 2016

Related U.S. Application Data

(63) Continuation of application No. PCT/EP2014/054896, filed on Mar. 12, 2014.

(30) Foreign Application Priority Data

Mar. 14, 2013  (GB) .................................. 1304624.8

(51) Int. Cl.
| | | |
|---|---|---|
| *C09J 133/14* | (2006.01) | |
| *C09J 4/00* | (2006.01) | |
| *C08K 5/55* | (2006.01) | |
| *C09D 133/14* | (2006.01) | |
| *C08F 216/12* | (2006.01) | |
| *C08F 220/28* | (2006.01) | |

(52) U.S. Cl.
CPC ............... *C09J 133/14* (2013.01); *C08K 5/55* (2013.01); *C09D 133/14* (2013.01); *C09J 4/00* (2013.01); *C08F 216/125* (2013.01); *C08F 220/28* (2013.01)

(58) Field of Classification Search
CPC .. C08J 133/14; C08J 4/00; C08K 5/55; C09D 133/14; C08F 216/125; C08F 220/28
See application file for complete search history.

(56) References Cited

U.S. PATENT DOCUMENTS

| | | |
|---|---|---|
| 4,525,232 A | 6/1985 | Rooney et al. |
| 4,999,216 A | 3/1991 | Gaske et al. |
| 7,247,596 B2 | 7/2007 | Jialanella et al. |
| 2007/0135601 A1 | 6/2007 | Diakoumakos et al. |
| 2007/0172989 A1 | 7/2007 | Rosini et al. |
| 2013/0053497 A1 | 2/2013 | Tully et al. |

FOREIGN PATENT DOCUMENTS

| | | |
|---|---|---|
| JP | H0411609 A | 1/1992 |
| JP | H07196947 A | 8/1995 |
| JP | H0940708 A | 2/1997 |

OTHER PUBLICATIONS

International Search Report for International Application No. PCT/EP2014/054896 dated Jun. 13, 2014.

JC Bevington et al., Journal Macromolecular Sciences: Pure and Applied Chemistry, vol. A36, p. 1907.

*Primary Examiner* — Nathan M Nutter
(74) *Attorney, Agent, or Firm* — Steven C. Bauman

(57) ABSTRACT

A curable composition based on a curable acrylate or methacrylate component; an organoborane initiator component; a vinyl ether component; and an activator for the organoborane component. The composition exhibits good storage stability and good bonding properties when used to bond low surface energy substrates.

10 Claims, No Drawings

CURABLE ACRYLATE OR METHACRYLATE COMPOSITIONS

FIELD OF THE INVENTION

The present invention relates to curable acrylate or methacrylate compositions.

BRIEF DESCRIPTION OF RELATED TECHNOLOGY

Organoboranes are often stabilised as amine complexes so that they do not undergo spontaneous autoxidation. These complexes can be activated by acids so that the organoborane can undergo autoxidation when required. However, in the presence of at least one of methacrylates and polymeric tougheners, organoborane: amines can lead to gelation of the composition, which is often a resin-based composition, thus significantly compromising stability over time. Such compositions often do not have a sufficiently long shelf life.

There is also a need for improved adhesion on low surface energy substrates. Low surface energy surfaces such as polyolefins, including polyethylene, polypropylene, polybutene, polyisoprene, and copolymers thereof, are well known to be difficult to bond to each other and to other surfaces using adhesive bonding technology. This is thought to be due to the fact that they have few active bonding sites available at the free surfaces. Low energy surfaces typically have surface energy values of less than 45 $mJ/m^2$, more typically less than 40 $mJ/m^2$, such as less than 35 $mJ/m^2$.

Bonding low energy surfaces by surface pre-treatments such as flame treatments, plasma treatments, oxidation, sputter etching, corona discharge, or primer treatments with a high surface energy material is well known. Such treatments disrupt the bonds at the surface of the low energy material providing sites which are reactive and which can participate in bonding reactions with adhesive materials. However, such surface pre-treatments are usually undesirable, in that they add cost to the process, they are not particularly reproducible in their results, and the effect of the pre-treatments wears off with time so the pre-treated surfaces must be re-pre-treated if they are not bonded within a reasonable period of time.

It is also desirable to provide stable, easy to mix, two-component formulations for bonding. It is advantageous to provide compositions suitable for use in structural bonding applications.

U.S. patent application Ser. No. 10/587,872 relates to the use of trialkylborane amines with organometallic aluminium compounds as a method for increasing the stability of borane: amine/methacrylate compositions. The organometallic aluminium compounds are however highly water and oxygen sensitive and can produce by-products which deleteriously affect adhesive performance.

U.S. Pat. No. 7,247,596 discloses hydroxyl amines or nitrile oxide as stabilisers for organoborane/methacrylate compositions. Shelf life stability is said to be increased by the use of such stabilisers but this is achieved sometimes with the consequence of reduced bond strength performance.

U.S. Pat. No. 4,999,216 relates to vinyl ether/methacrylate compositions. The composition is radically co-polymerised by a photo initiator in the presence of maleate or fumarate monomer. Such compositions require surface treatment of low energy surface substrates to allow effective bonding.

US20070135601 (Huntsman) relates to providing new complexes of organoboranes with amino functional organosilicon compounds which are effective polymerisation initiators for radically polymerisable systems. Huntsman describes use of the organoborane complexes as suitable polymerisation initiators for many polymerisable systems including acrylic or methacrylic monomers and radically polymerisable vinyl ethers.

US20040242817 (Kendall) also relates to new organoboranes and discloses internally coordinated organoboranes as varying sized rings formed from an unsaturated amine, amidine or guanidine and dialkylhydroborane under hydroboration conditions as well as two-part adhesive coating kits containing radical polymerizable material and the internally coordinated organoborane. Kendall describes adhesive or coating embodiments optionally containing a polyvinyl alkyl ether.

Similarly, WO2005000911 (also to Kendall) is concerned with cyclic organoboranes and compositions comprising same.

The product sold as Loctite® 3035 (available from Henkel Corporation, Rocky Hill, Conn., USA) is a two-part acrylic adhesive which uses a borane:annine initiator. In a first part it has an initiator and methacrylic esters. In the other part is has methacrylate esters and a co-polymerisable acid.

Notwithstanding the available solutions it is desirable to provide an alternative composition.

SUMMARY OF THE INVENTION

There is provided in one aspect a two part polymerisable composition comprising:
  a curable acrylate or methacrylate component;
  an organoborane initiator component;
  a vinyl ether component; and
  an activator for the organoborane component.

It has been found that compositions of the invention demonstrate good storage stability compared to other compositions comprising acrylate or methacrylate, organoborane and activator. Additives may be included in the composition to confer desirable physical properties, for example, polymeric tougheners, silicas and/or other rheology modifiers, for example naturally occurring mineral materials such as zeolites, halloysites, micas, talcs and other particulate material such as wood particulate materials including wood flours, and carbonate salts for example calcium carbonate, sodium carbonate, potassium carbonate, and/or magnesium carbonate, or combinations thereof.

The vinyl ether component may comprise a vinyl ether molecule, which has at least two vinyl ether groups, for example, a divinyl ether.

The vinyl ether component may comprise at least one of 1,4-Butanediol divinyl ether, diethyleneglycol divinyl ether, and triethyleneglycol divinyl ether.

Some embodiments of the present invention may comprise a two-part composition comprising:
  a curable acrylate or methacrylate component;
  a first part comprising an organoborane initiator component and a vinyl ether component; and
  a second part comprising an activator for the organoborane component.

The curable acrylate or methacrylate component may be in the same part of the two-part composition as the activator for the organoborane component.

The organoborane initiator component may comprise a trialkyl borane.

The organoborane initiator component may comprise a borane:amine complex, for example a trialkylborane:amine complex.

The organoborane initiator component may be present in an amount from about 0.1 to about 10% weight percentage based on the total weight of the composition, suitably in an amount from about 0.25 to about 5% weight percentage based on the total weight of the composition.

The activator for the organoborane compound may be selected from the group consisting of Lewis acids, carboxylic acids, phosphoric acids, anhydrides and isocyanates and combinations thereof.

The activator may be present in an amount from about 1 to about 40% weight percentage based on the total weight of the composition, suitably in an amount from about 2 to about 20% weight percentage based on the total weight of the composition.

Suitable acrylate or methacrylate components include: methyl acrylate, methyl methacrylate, 2-ethylhexyacrylate, 2-ethylhexyl methacrylate, tetrahydrofurfuryl acrylate, tetrahydrofurfuryl methacrylate, phenoxyethyl acrylate, phenoxyethyl methacrylate, ethyl acrylate, ethyl methacrylate, propyl acrylate, propyl methacrylate, n-butyl acrylate, n-butyl methacrylate, t-butyl acrylate, t-butyl methacrylate, isobornyl acrylate, isobornyl methacrylate, isooctyl acrylate, isooctyl methacrylate, acrylamide, n-methyl acrylamide, lauryl methacrylate and stearyl methacrylate, cyclohexyl methacrylate, hydroxyethyl acrylate, hydroxyethyl methacrylate, hydroxyethyl acrylate and hydroxypropyl methacrylate.

Other suitable acrylates or methacrylates are multimeric acrylates and methacrylates as shown below:

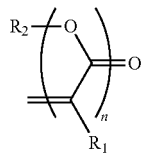

wherein, $R_1$ may be H or $C_1$-$C_{20}$ alkyl, suitably $CH_3$ and $R_2$ can link a plurality of monomeric acrylates and/or methacrylates; wherein $R_2$ may be selected from the group consisting of $C_1$-$C_{20}$ alkyl, $C_2$-$C_{20}$ alkenyl, $C_3$-$C_{20}$ cycloalkyl, $C_3$-$C_{20}$ cycloalkyl optionally having at least one C—C unsaturated bond in the ring, $C_5$-$C_{20}$ aryl, $C_3$-$C_{20}$ heteroaryl, urethane, urea, glycol, ether, polyether or glycidyl component, and combinations thereof, optionally substituted one or more times with at least one of hydroxy, amino, halogen, cyano, nitro, $C_1$-$C_5$ alkoxy, and/or $C_1$-$C_5$ thioalkoxy.

n can range from 2 to 4 (inclusive of 2 and 4) acrylate units. Examples include: diethylene glycol diacrylate, diethylene glycol dimethacrylate, 1,6-hexanediol diacrylate, 1,6-hexanediol dimethacrylate, neopentyl glycol diacrylate, neopentyl glycol dimethacrylate, polyethylene glycol diacrylate, polyethylene glycol dimethacrylate, tetraethylene glycol dimethacrylate, tetraethylene glycol dimethacrylate, triethylene glycol diacrylate, triethylene glycol dimethacrylate, trimethylolpropane triacrylate, trimethylolpropane trimethacrylate, pentaerythritol triacrylate, pentaerythritol trimethacrylate, tris(2-hydroxyethyl)Isocyanurate triacrylate, tris(2-hydroxyethyl)Isocyanurate trimethacrylate, tricyclodecanedimethanol diacrylate, tricyclodecanedimethanol dimethacrylate and ethoxylated bisphenol diacrylates and dimethacrylates.

Suitable acrylate or methacrylate monomeric units include methyl acrylate, methyl methacrylate, 2-ethylhexyl acrylate, 2-ethylhexyl methacrylate, lauryl methacrylate, stearyl methacrylate, isobornyl acrylate, diethylene glycol diacrylate, diethylene glycol dimethacrylate, 1,6-hexanediol diacrylate, 1,6-hexanediol dimethacrylate, neopentyl glycol diacrylate, neopentyl glycol dimethacrylate, polyethylene glycol diacrylate, polyethylene glycol dimethacrylate, tetraethylene glycol dimethacrylate, tetraethylene glycol dimethacrylate, triethylene glycol diacrylate, triethylene glycol dimethacrylate, or the like.

The acrylate or methacrylate component can be present in an amount from about 10 to about 95% weight percentage based on the total weight of the composition, desirably from about 20 to about 85% weight percentage based on the total weight of the composition.

The second part of the composition may comprise a curable component, suitably a maleate, fumarate or maleimide component or combinations thereof. Examples include (but are not limited to) mono-2-(acryloyloxy)ethyl maleate, mono-2-(methacryloyloxy)ethyl maleate, maleic anhydride, maleic acid, toxilic acid, fumaric acid, fumaramide, fumaryl nitrile, fumaryl chloride, fumarate monoethyl ester salts of zinc, calcium and magnesium, 2,5-pyrroledione and 1,1'-(methylenedi-4,1-phenylene)bismaleimide, or combinations thereof.

The second part of the composition may also comprise a protic acid compound capable of cationically curing vinyl ether monomers, examples include protic acids such as (but not limited to) acrylic acid, methacrylic acid, methanesulfonic acid, benzenesulfonic acid, p-toluenesulfonic acid, triflic acid or combinations thereof.

The second part of the composition may also comprise a Lewis acidic compound capable of cationically curing vinyl ether molecules, examples include (but not limited to) boron trichloride, boron trifluoride or lithium tetrafluoroborate or combinations thereof.

The maleate, fumarate or maleimide component is present in an amount from about 1 to about 20% weight percentage based on the total weight of the composition, suitably in an amount from about 1.5 to about 10% weight percentage based on the total weight of the composition. Some embodiments of the present invention may comprise a toughener component. Examples of toughener components include synthetic rubbers, such as acrylonitrile/butadiene rubber (NBR rubber), a polyurethane, styrene/butadiene rubber, styrene/butadiene/methacrylate rubber, chloroprene rubber or butadiene rubber, a natural rubber, a styrene thermoplastic elastomer such as styrene/polybutadiene/styrene synthetic rubber, a polyacrylate or polymethacrylate elastomer, a methacrylate/acrylate block co-polymer or an olefin thermoplastic elastomer such as polystyrene/EPDM (an ethylene/propylene/conjugated diene co-polymer) synthetic rubber. Chlorinated and chlorosulfonated polyethylene elastomers can also be used. The toughener component can also be a mixture or dispersion of these types of materials.

The toughener component can be present in an amount from about 5 to about 50% weight percentage based on the total weight of the composition, desirably in an amount from about 10 to about 30% weight percentage based on the total weight of the composition.

It is to be noted that when the present inventors refer to a curable acrylate or methacrylate component, this includes any curable composition based on curing through acrylate or methacrylate functionality and in particular does not exclude combinations of acrylates and/or methacrylates or indeed components having more than one curable functional group.

It will also be appreciated that combinations of organoborane initiator components may be employed. Combinations of vinyl ether components may be employed. And indeed combinations of activators for the organoborane component may be used.

The compositions of the invention show good storage stability yet are still activatable to provide strong and durable bonds.

Furthermore the compositions of the invention are suitable for use in bonding substrates with low surface energies. As mentioned above, low energy surfaces typically have surface energy values of less than 45 mJ/m$^2$, more typically less than 40 mJ/m$^2$, such as less than 35 mJ/m$^2$.

The compositions of the invention are suitable for use in bonding low surface energy substrates, either to another low surface energy substrate or to another substrate. For example compositions of the invention can be utilised in bonding polyolefins, including polyethylene, polypropylene, polybutene, polyisoprene, and copolymers thereof.

The vinyl ether component included in the composition for example in a Part B of the composition may be any vinyl ether, though desirable ones include bis[4-(vinyloxy)butyl] isophthalate (available commercially under the tradename VECTOMER™, such at VECTOMER™ 4010, the chemical structure of which is shown below):

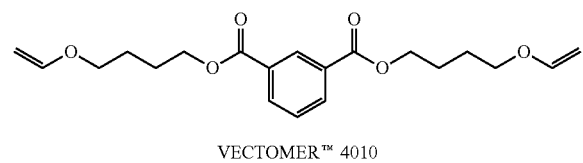 [SMILES: C=COCCCCOC(=O)c1cccc(C(=O)OCCCCOC=C)c1]

VECTOMER™ 4010

VECTOMER™ 5015 and VECTOMER™ 4020 may be used as well. Their chemical structures are shown below:

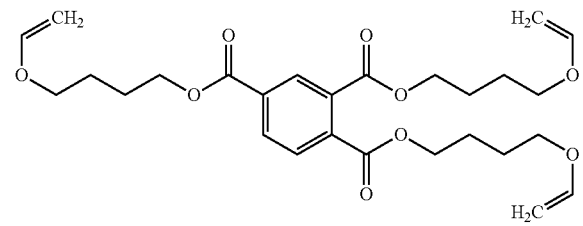

VECTOMER™ 5015

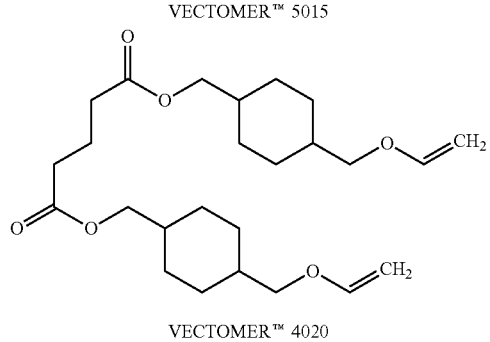

VECTOMER™ 4020

Additional vinyl ethers that may be used herein and are commercially available from BASF Corporation include Ethyl vinyl ether, n-Butyl vinyl ether, Iso-Butyl vinyl ether, t-Butyl vinyl ether, Cyclohexyl vinyl ether, 1,4-Cyclohexanedimethanol divinyl ether, 1,4-Cyclohexanedimethanol mono vinyl ether, 2-Ethylhexyl vinyl ether, Dodecyl vinyl ether, Octadecyl vinyl ether, 1,4-Butanediol divinyl ether, Diethyleneglycol divinyl ether, Triethyleneglycol divinyl ether and Hydroxybutyl vinyl ether and combinations thereof.

The vinyl ether component should be included in a Part A of the composition in an amount within the range of from about 0.1 to about 20%, such as to about 0.25 to about 5% by weight based on the total weight of the composition.

As discussed above, additives may be included in either or both of a Part A or Part B of the composition to influence a variety of performance properties.

Vinyl ethers/methacrylate compositions of the invention improve adhesion performance on polyolefin, plastic and metal substrates in comparison to organoborane compositions without vinyl ethers.

Vinyl ethers stabilise organoborane/acrylate and organoborane/methacrylate compositions without the need for anti-oxidants, free radical stabilisers or organometallic aluminium compounds. This is clearly demonstrated herein.

Above properties are combined, which is a distinct advantage over state of the art.

DETAILED DESCRIPTION

The invention relates to a curable composition and desirably one in the form of a two part polymerisable composition. Often a two part composition is referred to as having a "Part A" and a "Part B". Part A may include an organoborane initiator, preferably a trialkylborane:amine complex and a vinyl ether monomer (mono- and/or di-functional). Methacrylate or acrylate esters (both mono- and/or multi-functional), polymeric tougheners, silicas and other rheology modifiers are optionally included.

Part B contains methacrylate or acrylate esters (both mono- and/or multi-functional) and preferably compounds containing malaeic and/or fumarate functionality. An activator for the organoborane compound must also be present and can be chosen (but not limited to) from Lewis acids, carboxylic acids, phosphoric acids, anhydrides and isocyanates. Polymeric tougheners, silicas and other rheology modifiers are optionally included.

Part A and B were prepared in 500 g quantities by mixing the components using a static mixer, mixed with an overhead stirrer.

The components were then stored separately in a two part cartridge, which can dispense the parts and allow for mixing, for example through a static mixer, before application to a substrate. The components can be mixed in ratios from 1:1 to 10:1.

In the Examples below Parts A and B were mixed and dispensed through a cartridge fitted with a static mixer and applied to one lap shear covering the area up to 0.5" inches$^2$ (12.7 mm$^2$) which was then joined to another and clamped for 24 h at room temperature. Tensile bond strengths were determined using the following test method: the test method was based on ASTM D 1002-05. The lap shears measured 1"×4" (25.4 mm×101.6 mm) in dimensions and the joined lap shears overlapped at a 0.5" (12.7 mm) mark and were clamped with Hargrave No. 1 clamps. The bonded lap shears were tested using an Instron™ 5567A Materials testing System. The cross-head speed was 6 mm/min.

Heat ageing was done by packing the parts into two-part cartridges and heating at 35° C. in an oven. The effect of the heat ageing was compared by comparison of retention of lap shear tensile strength over time (using test method described above), or noting when the samples could not be dispensed from the cartridges due to gelation or hardening of the compositions.

EXAMPLE 1

1:1 mix ratio formulation containing triethyleneglycol divinyl ether and heat aging data

|  | wt. % |
|---|---|
| Part A | |
| Triethyleneglycol divinyl ether | 10 |
| Tetrahydrofurylmethacrylate (THFMA) | 61.5 |
| Ethylhexylmethacrylate (EHMA) | 6 |
| Triethylborane triethylenediamine complex (TEB:DETA) | 2.5 |
| Kraton ™ D 1155 ES | 20 |
| (Styrene-Butadiene-Styrene block co-polymer rubber) | |
| Part B | |
| THFMA | 48.98 |
| EHMA | 13 |
| TMPTMA (trimethylolpropane trimethacrylate) | 5 |
| mono-2-(Methacryloyloxy)ethyl maleate | 12 |
| Blendex ™ B362 | 20 |
| (Acrylonitrile-Styrene-Butadiene core shell rubber) | |
| Aerosil ™ R 972 (Hydrophilic fumed silica) | 1 |
| Iodine | 0.02 |

| Weeks @ 35° C. | PP-C MPa | PE MPa | GFPP-E Coated Steel MPa |
|---|---|---|---|
| 0 Weeks | 3.48 ± 0.17 | 3.06 ± 0.27 | 5.90 ± 0.27 |
| 1 Week | 3.44 ± 0.41 | 2.67 ± 0.79 | 5.16 ± 0.37 |
| 2 Weeks | 3.21 ± 0.13 | 3.62 ± 0.57 | 5.32 ± 0.94 |
| 3 Weeks | 3.80 ± 0.23 | 5.58 ± 0.39 | 4.47 ± 0.64 |
| 4 Weeks | 2.84 ± 0.03 | 4.41 ± 0.79 | 3.60 ± 1.34 |
| 5 Weeks | 2.61 ± 0.27 | 2.48 ± 0.27 | 4.70 ± 1.07 |
| 6 Weeks | 2.73 ± 0.11 | 2.32 ± 0.30 | 2.91 ± 0.22 |
| 7 Weeks | 3.00 ± 0.10 | 2.13 ± 0.01 | 2.82 ± 1.02 |
| 8 Weeks | Part A could not be dispensed | | |

EXAMPLE 2

1:1 mix ratio formulation containing no vinyl ether and heat aging data:

|  | wt. % |
|---|---|
| Part A | |
| Tetrahydrofurylmethacrylate (THFMA) | 71.5 |
| Ethylhexylmethacrylate (EHMA) | 6 |
| Triethylborane triethylenedimane complex (TEB:DETA) | 2.5 |
| Kraton ™ D 1155 ES | 20 |
| (Styrene-Butadiene-Styrene block co-polymer rubber) | |
| Part B | |
| THFMA | 48.98 |
| EHMA | 13 |
| TMPTMA (trimethylolpropane trimethacrylate) | 5 |
| mono-2-(Methacryloyloxy)ethyl maleate | 12 |
| Blendex ™ B362 | 20 |
| (Acrylonitrile-Styrene-Butadiene core shell rubber) | |
| Aerosil ™ R 972 (Hydrophilic fumed silica) | 1 |
| Iodine | 0.02 |

| Weeks @ 35° C. | PP-C MPa | PE MPa | GFPP-E Coated Steel MPa |
|---|---|---|---|
| 2 Weeks | 2.26 ± 0.88 | 3.00 ± 0.59 | 5.06 ± 1.00 |
| 3 Weeks | 2.92 ± 0.25 | 4.48 ± 0.99 | 4.04 ± 0.31 |
| 4 Weeks | Part A Polymerised | | |

Example 2 shows that removal of the triethylenegylcol divinyl ether reduces the stability of Part A.

EXAMPLE 3

1:1 mix ratio formulation containing cyclohexanedimethanol divinyl ether and heat aging data:

|  | wt. % |
|---|---|
| Part A | |
| Cyclohexanedimethanol divinyl ether | 10 |
| Tetrahydrofurylmethacrylate (THFMA) | 61.5 |
| Ethylhexylmethacrylate (EHMA) | 6 |
| Triethylborane triethylenediamine complex (TEB:DETA) | 2.5 |
| Kraton ™ D 1155 ES | 20 |
| (Styrene-Butadiene-Styrene block co-polymer rubber) | |
| Part B | |
| THFMA | 48.98 |
| EHMA | 13 |
| TMPTMA (trimethylolpropane trimethacrylate) | 5 |
| mono-2-(Methacryloyloxy)ethyl maleate | 12 |
| Blendex ™ B362 | 20 |
| (Acrylonitrile-Styrene-Butadiene core shell rubber) | |
| Aerosil ™ R 972 (Hydrophilic fumed silica) | 1 |
| Iodine | 0.02 |

| Weeks @ 35° C. | PP-C MPa | PE MPa | GFPP-E Coated Steel MPa |
|---|---|---|---|
| 0 Weeks | 6.99 ± 0.04 | 4.60 ± 1.58 | 3.99 ± 0.57 |
| 1 Week | 6.56 ± 0.09 | 5.01 ± 0.40 | 4.16 ± 0.67 |
| 2 Weeks | 5.97 ± 1.02 | 4.31 ± 0.71 | 4.32 ± 1.94 |
| 3 Weeks | 5.05 ± 0.65 | 4.02 ± 0.65 | 4.38 ± 0.95 |
| 4 Weeks | 5.34 ± 0.22 | 3.76 ± 0.32 | 3.98 ± 0.66 |
| 5 Weeks | 5.29 ± 0.54 | 3.54 ± 0.75 | 3.46 ± 1.29 |
| 6 Weeks | 5.24 ± 1.56 | 3.02 ± 0.33 | 3.42 ± 1.56 |
| 7 Weeks | 5.76 ± 0.83 | 3.11 ± 0.04 | 3.01 ± 1.06 |
| 8 Weeks | 3.24 ± 0.89 | 2.98 ± 0.51 | 3.68 ± 0.76 |

Example 3 shows that similar to example 1 the divinyl ether cyclohexanedimethanol divinyl ether imparts improved stability and better performance in comparison to example 2.

EXAMPLE 4

1:1 mix ratio formulation containing n-butylvinyl ether and heat aging data:

|  | wt. % |
|---|---|
| Part A | |
| n-Butylvinyl ether | 10 |
| Tetrahydrofurylmethacrylate (THFMA) | 61.5 |
| Ethylhexylmethacrylate (EHMA) | 6 |
| Triethylborane triethylenediamine complex (TEB:DETA) | 2.5 |
| Kraton ™ D 1155 ES | 20 |
| (Styrene-Butadiene-Styrene block co-polymer rubber) | |
| Part B | |
| THFMA | 48.98 |
| EHMA | 13 |
| TMPTMA (trimethylolpropane trimethacrylate) | 5 |
| mono-2-(Methacryloyloxy)ethyl maleate | 12 |
| Blendex ™ B362 | 20 |
| (Acrylonitrile-Styrene-Butadiene core shell rubber) | |
| Aerosil ™ R 972 (Hydrophilic fumed silica) | 1 |
| Iodine | 0.02 |

-continued

| Weeks @ 35° C. | PP-C MPa | PE MPa | GFPP-E Coated Steel MPa |
|---|---|---|---|
| 0 Weeks | 5.33 ± 1.23 | 5.50 ± 0.61 | 6.98 ± 0.47 |
| 1 Week | 4.99 ± 0.80 | 5.32 ± 0.12 | 6.34 ± 1.59 |
| 2 Weeks | 5.62 ± 1.45 | 5.07 ± 0.34 | 7.03 ± 0.72 |
| 3 Weeks | 5.12 ± 0.12 | 4.51 ± 0.46 | 6.92 ± 1.23 |
| 4 Weeks | 4.76 ± 0.33 | 4.01 ± 0.12 | 6.11 ± 2.35 |
| 5 Weeks | 4.21 ± 0.65 | 4.26 ± 0.60 | 6.27 ± 2.30 |
| 6 Weeks | 4.45 ± 0.71 | 3.32 ± 0.25 | 3.87 ± 2.57 |
| 7 Weeks | Part A Could not be dispensed | | |

Example 4 shows that although n-butylvinyl ether imparts better stability than example 2, it does not perform as well as the divinyl ethers in examples 1 and 3.

EXAMPLE 5

1:1 mix ratio formulation containing hydroxybutyl vinyl ether and heat aging data:

| | wt. % |
|---|---|
| Part A | |
| n-HydroxyButylvinyl ether | 10 |
| Tetrahydrofurylmethacrylate (THFMA) | 61.5 |
| Ethylhexylmethacrylate (EHMA) | 6 |
| Triethylborane triethylenediamine complex (TEB:DETA) | 2.5 |
| Kraton ™ D 1155 ES | 20 |
| (Styrene-Butadiene-Styrene block co-polymer rubber) | |
| Part B | |
| THFMA | 48.98 |
| EHMA | 13 |
| TMPTMA (trimethylolpropane trimethacrylate) | 5 |
| mono-2-(Methacryloyloxy)ethyl maleate | 12 |
| Blendex ™ B362 | 20 |
| (Acrylonitrile-Styrene-Butadiene core shell rubber) | |
| Aerosil ™ R 972 (Hydrophilic fumed silica) | 1 |
| Iodine | 0.02 |

| Weeks @ 35° C. | PP-C MPa | PE MPa | GFPP-E Coated Steel MPa |
|---|---|---|---|
| 0 Weeks | 6.88 ± 1.07 | 5.34 ± 0.40 | 7.65 ± 0.28 |
| 1 Week | 5.95 ± 0.56 | 5.11 ± 0.85 | 6.45 ± 0.77 |
| 2 Weeks | 5.67 ± 0.59 | 5.30 ± 0.12 | 6.12 ± 0.53 |
| 3 Weeks | 5.76 ± 0.88 | 5.32 ± 0.25 | 4.70 ± 0.46 |
| 4 Weeks | Part A could not be dispensed. | | |

Example 5 also shows that the vinyl ether n-hydroxylbutylvinyl ether does not impart stability and performance as well as the divinyl ethers in examples 1 and 3.

EXAMPLE 6

10:1 Mix ratio formulation containing triethyleneglycol divinyl ether and heat aging data:

| | wt. % |
|---|---|
| Part A1 (1 Part) | |
| Triethyleneglycol divinyl ether | 73.68 |
| TEB:DETA | 21.05 |
| Aerosil ™) R 972 | 5.26 |
| Part B (10 Parts) | |
| THFMA | 50 |
| EHMA | 13 |
| TMPTMA | 5 |
| mono-2-(Methacryloyloxy)ethyl maleate | 12 |
| Blendex ™ B362 | 20 |

| Weeks @ 35° C. | GFPP-E Coat MPa | PP-C MPa | PE MPa | Gel Time |
|---|---|---|---|---|
| 0 Weeks | 7.76 ± 4.17 | 3.88 ± 0.54 | 5.21 ± 0.96 | 18 sec |
| 1 Week | 9.89 ± 0.62 | 6.76 ± 0.06 | 5.44 ± 0.62 | 18 sec |
| 2 Weeks | 8.61 ± 1.62 | 6.41 ± 0.67 | 5.21 ± 1.82 | 18 sec |
| 3 Weeks | 8.91 ± 2.09 | 6.20 ± 0.98 | 5.93 ± 0.39 | 18 sec |
| 4 Weeks | 6.50 ± 1.80 | 6.59 ± 0.66 | 5.52 ± 0.20 | 16 sec |
| 5 Weeks | 7.06 ± 0.62 | 5.77 ± 1.36 | 5.76 ± 0.53 | 18 sec |
| 6 Weeks | 5.58 ± 1.05 | 6.09 ± 0.43 | 4.44 ± 1.73 | 18 sec |
| 7 Weeks | 6.30 ± 1.37 | 3.90 ± 1.34 | 3.83 ± 0.51 | 18 sec |
| 8 Weeks | 6.02 ± 0.40 | 3.70 ± 1.04 | 3.53 ± 0.50 | 20 sec |

EXAMPLE 7

10:1 Mix ratio formulation containing butanediol divinyl ether and heat aging data:

| | wt. % |
|---|---|
| Part A1 (1 Part) | |
| Butanediol divinyl ether | 73.68 |
| TEB:DETA | 21.05 |
| Aerosil ™ R 972 | 5.26 |
| Part B (10 Parts) | |
| THFMA | 50 |
| EHMA | 13 |
| TMPTMA | 5 |
| mono-2-(Methacryloyloxy)ethyl maleate | 12 |
| Blendex ™ B362 | 20 |

| Weeks @ 35° C. | GFPP-E Coat MPa | PP-C MPa | PE MPa | Gel Time |
|---|---|---|---|---|
| 0 Weeks | 9.19 ± 1.15 | 6.30 ± 0.74 | 6.25 ± 0.10 | 15 sec |
| 1 Week | 9.99 ± 2.22 | 6.52 ± 0.24 | 6.09 ± 0.04 | 15 sec |
| 2 Weeks | 8.54 ± 1.40 | 6.30 ± 1.16 | 3.41 ± 2.16 | 15 sec |
| 3 Weeks | 9.73 ± 0.32 | 6.92 ± 0.12 | 5.62 ± 0.38 | 15 sec |
| 4 Weeks | 6.65 ± 1.46 | 6.29 ± 0.11 | 3.38 ± 0.72 | 15 sec |
| 5 Weeks | 5.92 ± 0.53 | 5.50 ± 2.06 | 5.66 ± 0.53 | 25 ec |

EXAMPLE 8

10:1 Mix ratio formulation containing methacrylate monomer instead of vinyl ether and heat aging data:

| | wt. % |
|---|---|
| Part A1 (1 Part) | |
| THFMA | 73.68 |
| TEB:DETA | 21.05 |
| Aerosil ™ R 972 | 5.26 |
| Part B (10 Parts) | |
| THFMA | 50 |
| EHMA | 13 |
| TMPTMA | 5 |
| mono-2-(Methacryloyloxy)ethyl maleate | 12 |
| Blendex ™ B362 | 20 |

-continued

| Weeks @ 35° C. | GFPP- E Coat MPa | PP-C MPa | PE MPa | Gel Time |
|---|---|---|---|---|
| 0 Weeks | 7.24 ± 0.15 | 6.30 ± 0.74 | 5.05 ± 0.13 | 20 sec |
| 1 Week | 8.79 ± 2.57 | 5.56 ± 0.94 | 4.23 ± 0.34 | 25 sec |
| 2 Weeks | 4.54 ± 1.49 | 4.31 ± 1.43 | 2.41 ± 0.19 | 35 sec |
| 3 Weeks | Part A could not be dispensed | | | |

Examples 6 and 7 containing divinyl ethers and borane:amine in the same part show improved stability in comparison to methacrylate ester monomer THFMA and borane:amine in the same part.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A curable composition comprising:
   a curable (meth)acrylate component comprising the combination of at least two (meth)acrylate monomers, at least one of which is tetrahydrofurfuryl (meth)acrylate;
   an organoborane:triethylene diamine complex;
   an initiator component for the organoborane component comprising a vinyl ether component; and
   an activator for the organoborane component, wherein the vinyl ether component is present in an amount of 0.25 to 5% weight based on the total composition and is a member selected from the group consisting of bis[4-(vinyloxy)butyl]isophthalate, ethyl vinyl ether, n-butyl vinyl ether, iso-butyl vinyl ether, t-butyl vinyl ether, cyclohexyl vinyl ether, 1,4-cyclohexanedimethanol divinyl ether, 1,4-cyclohexanedimethanol mono vinyl ether, 2-ethylhexyl vinyl ether, dodecyl vinyl ether, octadecyl vinyl ether, 1,4-butanediol divinyl ether, diethyleneglycol divinyl ether, triethyleneglycol divinyl ether, hydroxybutyl vinyl ether,

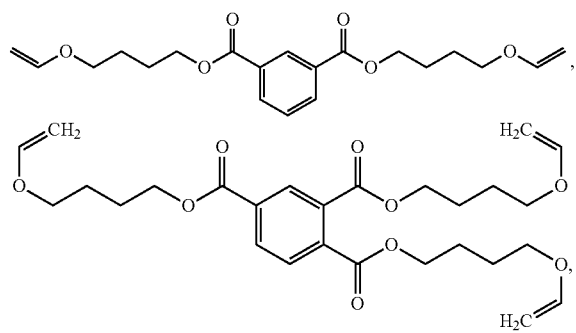

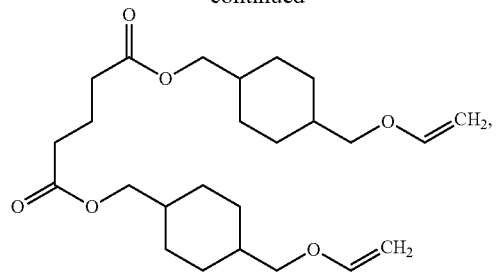

and combinations thereof, wherein the curable composition is in a two-part form with the curable (meth)acrylate component present in at least one of Part A or Part B, wherein
   Part A comprises the organoborane:triethylene diamine complex and the vinyl ether initiator component; and
   Part B comprises the activator for the organoborane component and wherein the curable composition is substantially free of added anti-oxidants, free radical stabilizers or organo aluminum compounds.

2. A composition according to claim 1 wherein the organoborane:triethylene diamine complex is present in an amount from about 0.1 to about 10% weight percentage based on the total weight of the composition.

3. A composition according to claim 1 wherein the activator for the organoborane compound is selected from the group consisting of Lewis acids, carboxylic acids, phosphoric acids, anhydrides and isocyanates and combinations thereof.

4. A composition according to claim 1 wherein the activator is present in an amount from about 1 to about 40% weight percentage based on the total weight of the composition.

5. A composition according to claim 1 wherein the (meth)acrylate component is present in an amount from about 10 to about 95% weight percentage based on the total weight of the composition.

6. A composition according to claim 1 wherein the second part comprises a curable maleate, fumarate or maleimide component.

7. A composition according to claim 6 wherein the maleate, fumarate or maleimide component is present in an amount from about 1 to about 20% weight percentage based on the total weight of the composition.

8. A composition according to claim 1 further comprising a toughener component.

9. A composition according to claim 8 wherein the toughener component is present in an amount from about 5 to about 50% weight percentage based on the total weight of the composition.

10. A curable composition consisting of:
   a curable (meth)acrylate component comprising the combination of at least two (meth)acrylate monomers, at least one of which is tetrahydrofurfuryl (meth)acrylate;
   an organoborane:triethylene diamine complex;
   an initiator component for the organoborane component comprising a vinyl ether component; and
   an activator for the organoborane component, wherein the vinyl ether component is present in an amount of 0.25 to 5% weight based on the total composition and is a member selected from the group consisting of bis[4-(vinyloxy)butyl]isophthalate, ethyl vinyl ether, n-butyl vinyl ether, iso-butyl vinyl ether, t-butyl vinyl ether, cyclohexyl vinyl ether, 1,4-cyclohexanedimethanol divinyl ether, 1,4-cyclohexanedimethanol mono vinyl ether, 2-ethylhexyl vinyl ether, dodecyl vinyl ether, octadecyl vinyl ether, 1,4-butanediol divinyl ether, diethyleneglycol divinyl ether, triethyleneglycol divinyl ether, hydroxybutyl vinyl ether,

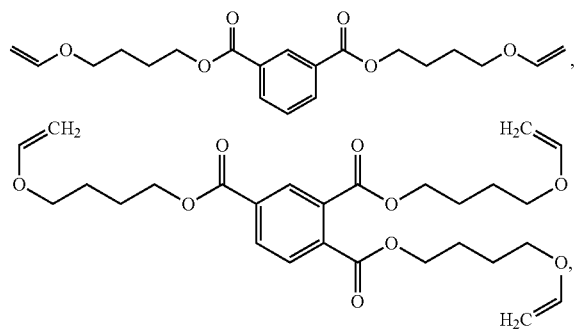

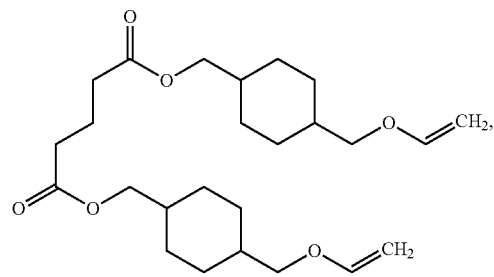

and combinations thereof, wherein the curable composition is in a two-part form with the curable (meth)acrylate component present in at least one of Part A or Part B, wherein Part A comprises the organoborane:triethylene diamine complex and the vinyl ether initiator component; and Part B comprises the activator for the organoborane component and wherein the curable composition is substantially free of added anti-oxidants, free radical stabilizers or organo aluminum compounds.

* * * * *

UNITED STATES PATENT AND TRADEMARK OFFICE
CERTIFICATE OF CORRECTION

PATENT NO. : 9,732,257 B2
APPLICATION NO. : 14/852751
DATED : August 15, 2017
INVENTOR(S) : James Houlihan, Brendan Kneafsey and Nigel Sweeney Page 1 of 1

It is certified that error appears in the above-identified patent and that said Letters Patent is hereby corrected as shown below:

In the Specification

Column 2, Line 23: Change "annine" to -- amine --.

Column 8, Line 1: Change "triethylenegylcol" to -- triethyleneglycol --.

Signed and Sealed this
Fifteenth Day of May, 2018

Andrei Iancu
*Director of the United States Patent and Trademark Office*